United States Patent [19]
Yassan

[11] Patent Number: 6,008,723
[45] Date of Patent: Dec. 28, 1999

[54] VEHICLE MESSAGE RECORDING SYSTEM

[75] Inventor: Mohammadreza Yassan, Dearborn, Mich.

[73] Assignee: Ford Global Technologies, Inc., Dearborn, Mich.

[21] Appl. No.: 08/337,806

[22] Filed: Nov. 14, 1994

[51] Int. Cl.[6] ..................................................... B60Q 1/00
[52] U.S. Cl. ........................ 340/438; 340/457; 340/692
[58] Field of Search ..................... 340/438, 460, 340/692, 457, 457.4; 381/86

[56] References Cited

U.S. PATENT DOCUMENTS

| | | | |
|---|---|---|---|
| 4,426,691 | 1/1984 | Kawasaki | 340/460 |
| 4,713,648 | 12/1987 | McSweeney | 340/692 |
| 4,839,749 | 6/1989 | Franklin | 340/460 |
| 4,875,229 | 10/1989 | Palett et al. | 379/58 |
| 4,933,852 | 6/1990 | Lemelson | 340/439 |
| 5,193,141 | 3/1993 | Zwern | 395/2 |

FOREIGN PATENT DOCUMENTS 0297473  6/1988  European Pat. Off. .

*Primary Examiner*—Donnie L. Crosland
*Attorney, Agent, or Firm*—Mark L. Mollon; Roger L. May

[57] ABSTRACT

A voice message system for motor vehicles includes an audio reproduction and recording system, and a control that interfaces the audio system with the vehicle function controls. Preferably, an ignition switch sensor signal received at the control initiates a command for playback of current time or periodic time designated messages. The control may also interface with a sensor signal responsive to an air bag diagnostic switch for actuating the recording of vocalized instructions or comments. In addition, a single actuator for immediate recording capability, as well as a microphone for receiving vocalized messages are conveniently packaged in the steering control mechanism.

17 Claims, 5 Drawing Sheets

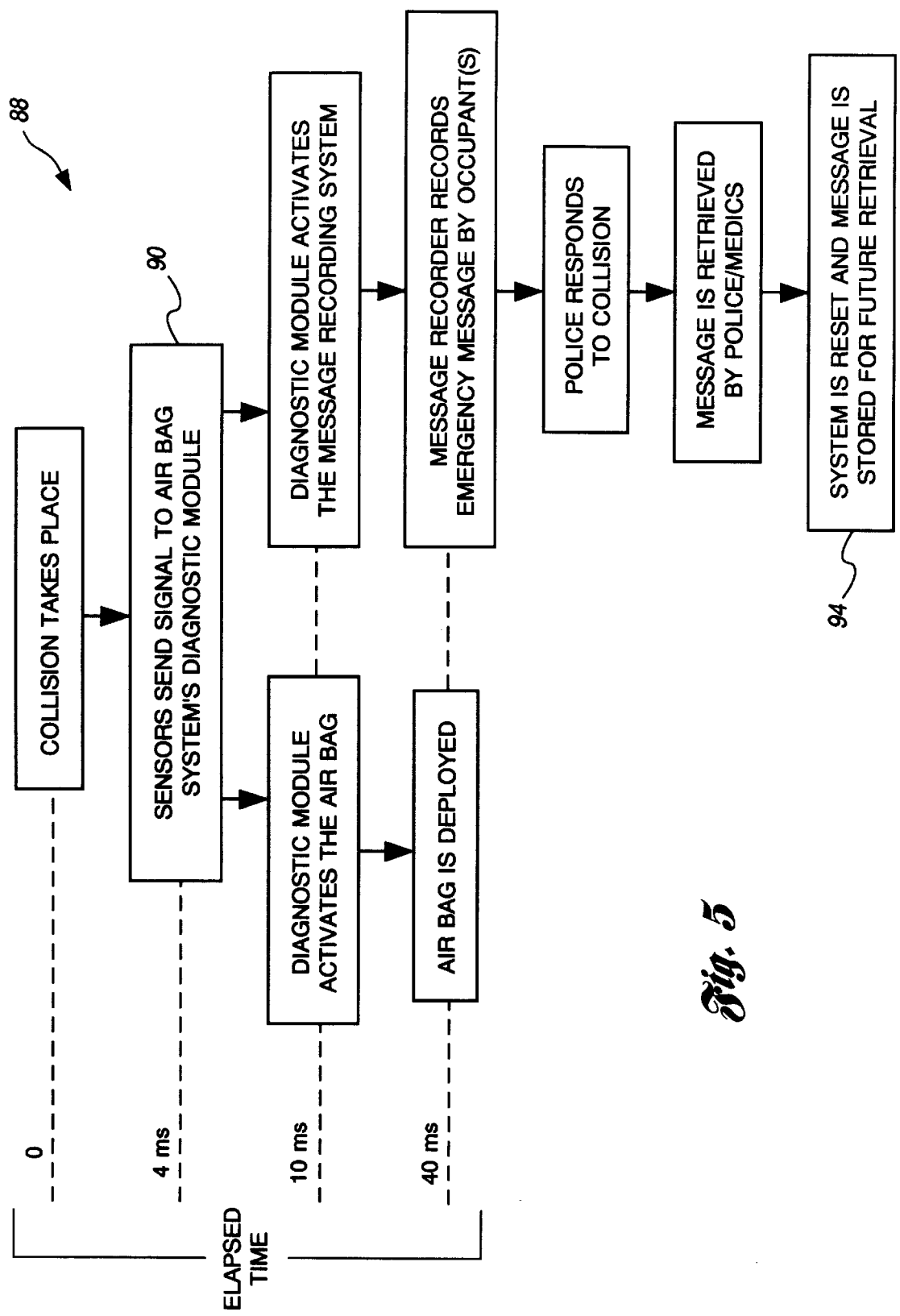

VEHICLE MESSAGE RECORDING SYSTEM

FIELD OF THE PRESENT INVENTION

The present invention relates generally to an audio system for use in motor vehicles, and more particularly to controls for the audio system that simplify the users interfacing with recording and playback features.

BACKGROUND ART

Many motor vehicles are provided with audio systems. The playback features of most known systems are generally limited to sound reproduction of prerecorded material on media such as compact discs, tape or cassette tape players, and AM/FM radio receivers. One problem with previously known audio systems is that multiplication of the features available to the user often requires a corresponding multiplication of actuators in order to utilize the added features. Accordingly, the user may be confronted with numerous controls or switches to be operated to take advantage of features which are available for playback in the previously known motor vehicle audio systems. As a result, numerous audio systems are difficult to control during operation of the motor vehicle.

In addition, the previously known motor vehicle audio systems do not typically include recording capability in the system.

Further, the process of operating one media unit as a source and another media unit simultaneously as a receiver can be quite complicated with even the most sophisticated equipment, and the complexity of the procedure does not render such a system useful in the context of operating a motor vehicle. For example, a cassette tape media unit's recording function often requires simultaneous actuation of two buttons, both a play button and a record button, after a third actuator power button for the media unit has been actuated. Moreover, the power button of a second media unit and the play button for the media unit used as a source in a recording process must also be actuated. Furthermore, a pause function actuator is also typically used in order to cue the selection at an appropriate time on either or both of the media operating units used as a source or a receiver. Accordingly, previously known systems are not well adapted for the vehicle driver recording messages during vehicle operation as they require a substantial amount of attention.

One previously known attempt to incorporate an improved communication system with an audio system is interfacing between the telephone system and the audio entertainment system of a motor vehicle. In such a system, a prioritizing interface enables the audio system volume to be reduced when a telephone call is being answered by the vehicle user. However, such interfacing involves two complete and independent telephone and audio entertainment systems and is subject to the limitations of the systems. Typically, voice mail features associated with mobile telephones require numerous keyboard inputs in order to activate and retrieve voice mail messages through the system, and such recording and receiving features are unrelated to the audio system. Likewise, the controls for operating the entertainment system do not interact with the controls for the mobile telephone system. Accordingly, a multitude of actuators must be employed by the operator in order to use the limited features of each of the systems. Newer cab forward designs particularly reduce the area for packaging vehicle components.

One previously known apparatus for recording and playback of audio messages in a communication system for use in a motor vehicle is disclosed in U.S. Pat. No. 4,875,229. The patent discloses a sun visor incorporating a cellular telephone, a recording medium apparatus and playback of prerecorded tapes. However, such a system merely joins the multiple actuators and features of the independent telephone, record and playback actuators as well as independent recording and reproduction equipment, as well as microphones and speakers, in a single unit. The patented visor does not incorporate the features of existing audio reproduction equipment that may also be carried in the vehicle. The actuator or keyboard panel is a complicated combination of previously known independent apparatus features arranged in a conglomeration on a single key pad which further diverts the user's attention from the road. Moreover, the user's hand must be positioned in front of the user's face in order to reach the controls and operate them in the manner of the previously known independent systems. In addition, the features of this system do not interact with vehicle operating systems so as to be responsive to particular conditions experienced during operation of the motor vehicle in an automatic reactionary response. Furthermore, incorporation of all systems within the sun visor substantially increase the weight and complexity of the sun visor structure, and thus requires reinforcement of the mounting and swivel joint structures of the sun visor.

Another previously known combination of independent communication systems in a motor vehicle is disclosed in European Publication No. 029747382. The apparatus includes a radio system for traffic broadcast reception with a digital memory for recording a traffic announcement. The apparatus includes a control system that stores broadcasts and replaces the last stored announcement when subsequent reports are broadcast. However, such a system requires that a separate NF low frequency signal be transmitted from the radio wave source during the traffic announcement to distinguish it from other information being broadcast on the same carrier frequency to the radio wave receiver in the motor vehicle. Although such a system substantially reduces the complexity of operating the on-board equipment as it requires only actuation of a calling key, the equipment external to the vehicle is also required to operate the system. This system does not permit personalized messages or other communications to be generated or received by the vehicle user as may be desired. Furthermore, each of the record and playback functions is limited to interfacing with a system by actuators in much the same manner as previously known recording and playback apparatus.

SUMMARY OF THE INVENTION

The present invention overcomes the above-mentioned disadvantages by providing motor vehicle message recording system that incorporates audio recording and playback features with simplified controls and enhanced playback features incorporated with the vehicle operating feature actuators. In general, a vehicle communication system including the Vehicle Message System (VMS) passively or automatically replays an audio reminder message in response to a motor vehicle operating function actuator. In addition, the system includes a control that permits passive and active message recording, message storing and message replaying with existing audio system components. In addition, the user interface features reduce user distraction and permit greater attention to be directed to the motor vehicle operating functions being performed by the user while recording and replaying a message.

In general, the present invention enhances a motor vehicle's audio system, for example, an entertainment system including a cassette player, compact disc player, tuner and receiver or any well known combination of these features. In addition, the entertainment system generally includes output transducers in the form of loudspeakers for disseminating sound in the passenger compartment of the vehicle. The present system incorporates a message control module to provide recording and playback control signals to the audio system as well as an electronic calendar microprocessor system that enables the control to process time designation signals to be associated with the audio message signals created in conjunction with the audio system. Such components may be readily incorporated, for example by software installations, in a microprocessor control unit associated with the audio entertainment system of the motor vehicle. In addition the present system includes an actuator terminal and an input transducer such as a microphone, that are mounted at a convenient access position to minimize the user's distraction and permit the continued monitoring of traffic conditions and controlling automobile maneuvering. Furthermore, the control module acts as an interface with vehicle function actuators in order to generate passive record and passive replay command signals that initiate automatic operation of the record and replay features of the audio system.

In the preferred embodiment, the control module is incorporated with the microprocessing control module of a digital signal processing (DSP) audio system. Moreover, the actuator for initial access to the recording system, preferably a single button actuator, and the microphone for audio input to the audio system, are conveniently packaged in association with the steering wheel so as to be positioned for ready use by the driver. The preferred packaging reduces driver distraction from monitoring traffic conditions and manipulation of other vehicle operations and functions.

An advantageous feature of the preferred embodiment is that the control module interfaces with the ignition switch to provide a passive replay feature that automatically replays one or more recorded messages when the ignition switch is engaged. Accordingly, reminders of current or upcoming anniversary dates, birthdays, periodic vehicle maintenance and the like may be easily made and timely replayed when the vehicle is operated. The audio message is preferably associated with a predetermined time designation. When the predetermined time designation is a current time designation, the message is played at each actuation of the vehicle function actuator, for example, the ignition key switch. In addition, a counter may determine when the audio message has been played back a predetermined number of times, return to storage for accessing at another date if the predetermined number such as three has not been reached, or deleted from the system if the number has been reached.

Another advantageous feature in the preferred embodiment permits pertinent concurrent information to be recorded or pertinent medical conditions such as allergies suffered or medications used by a motor vehicle user, after the air bag diagnostic switch has detected and generated a response to a vehicle condition. The air bag diagnostic switch interfaces with the control module to permit immediate passive recording of an emergency audio message from the user immediately after the air bag diagnostic switch has been activated. Preferably, the audio message will be stored as a signal for immediate playback.

As a result, the present invention reduces distraction of the vehicle user while recording or replaying an audio message. Moreover, the system passively reminds vehicle users of tasks that need to be performed or dates which must be remembered without an active user interfacing with equipment and without interference with operation of the motor vehicle. Moreover, each audio message can be programmed to be associated with particular time designation, and the replays may be repeated a predetermined number of times, such as three consecutive ignition actuations, as desired by the vehicle user. In addition, passive recording may occur in an emergency situation which will permit an audio message to be preserved for retrieval by police, medical attendants, or investigators seeking details of the incident causing a passive response switch actuation. Moreover, the system can be implemented with common hardware installed for use with a vehicle audio system, and reduces the number of actuators or transducers that must be packaged with the system to provide these advantageous features. Moreover, the system is particularly user friendly and does not require time consuming learning or the set up of the system in order to permit an operator to access the system.

BRIEF DESCRIPTION OF THE DRAWING

The present invention will be better understood by reference to the following detailed description of the preferred embodiment when read in conjunction with the accompanying drawing in which like reference characters refer to like parts throughout the views and in which:

FIG. 5 is diagrammatic flow chart of a program for passive message recording with an audio system according to the present invention.

DESCRIPTION OF THE PREFERRED EMBODIMENT

Figure 1:
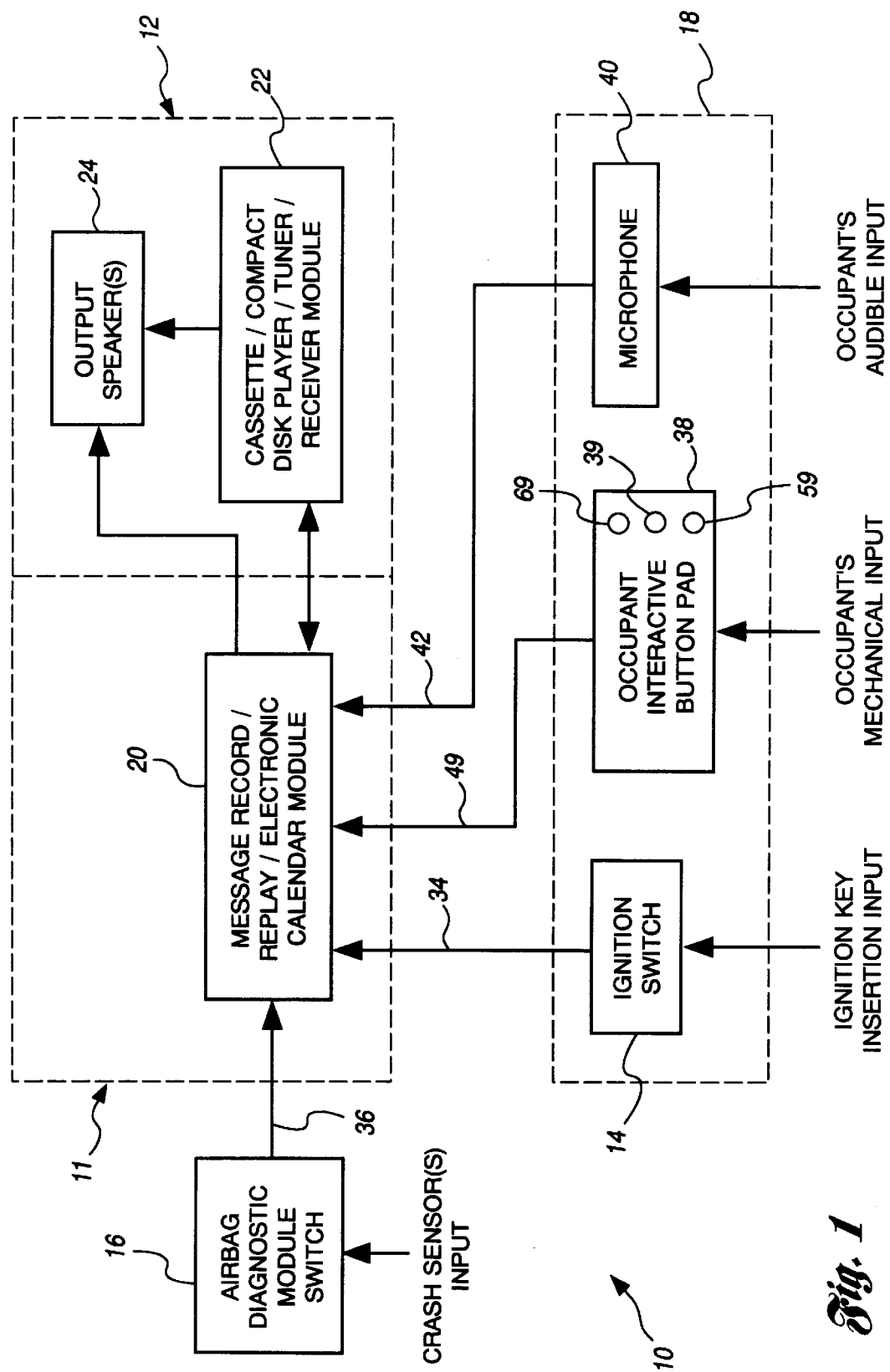
FIG. 1 is a diagrammatic of an audio system layout for a motor vehicle according to the present invention.

Referring first to FIG. 1, a motor vehicle communication system 10 is shown comprising a vehicle message system 11 combined with a vehicle audio system 12 and interfacing with vehicle operating features. For example, an ignition switch 14, an air bag deployment switch 16 and a steering wheel 18 serve particularly useful features in the preferred system of the present invention as will be described in greater detail below. These vehicle operation actuators interface with a control unit 20 which in the preferred embodiment, is incorporated as a programmed portion of a microprocessing unit of the audio system 12. Other portions of the audio system 12, such as the entertainment unit 22 and the speakers 24, may be of the type conventionally employed in motor vehicles. In the preferred embodiment, the unit 22 comprises a digital signal processing (DSP) multi-drive entertainment unit including a cassette recorder and player, compact disc player and a tuner/receiver for delivering source outputs to the speakers 24.

The control module 20 incorporates electronic calendar features such as those available in the Voice Organizer (for example, Sharper Image Model No. SI 5500), Voice It, etc. The voice Organizer presents a preferred user interface with a voice recognition capability in conjunction with keypad commands to easily insert commands for recurrent or periodic reminders, time, dates and messages. The control module 20 also includes interface circuits for receiving a command signal 34 passed from a sensor in response to operation of the vehicle function switch, for example, the ignition switch, to be used in generating a passive replay of an audio message. Similarly, the control unit 20 includes an interface for receiving a passive record command signal 36 responsive to the sensing of an air bag diagnostic switch actuation. The air bag diagnostic switch is a conventional unit such as a Rolamite-type or other electromechanical or solid state electronic accelerometer switch that determines whether a sensed condition is severe enough to require air bag deployment. Typically, the switch requires simultaneous activation of multiple accelerometers to generate a control signal for an air bag deployment mechanism when required.

For convenience, a motor vehicle user interacts with a button pad 38 that is mounted at the steering wheel 18. Since the user's hands usually are positioned on the steering wheel during operation of the motor vehicle, such a placement is particularly convenient to avoid physical searching for a switch and to reduce prolonged release of the steering mechanism. Preferably, the interactive button pad comprises a single actuator for initiating recording in the audio system 12. As well as other actuators deemed necessary such as time, store, erase, save, and select actuators. Preferably, the pad is located at the steering column, although additional, alternative, or redundant keypads may be used. In addition, the steering wheel 18 is provided with a microphone 40 so that the vehicle driver can continue attention forwardly of the vehicle while projecting the voice forwardly toward the microphone to introduce an audio message signal into the vehicle audio system. Nevertheless, other locations such as the sun visor for either of the user access inputs 38 and 40 may be useful in packaging the system for particular body styles or vehicle compartments.

Figure 2:
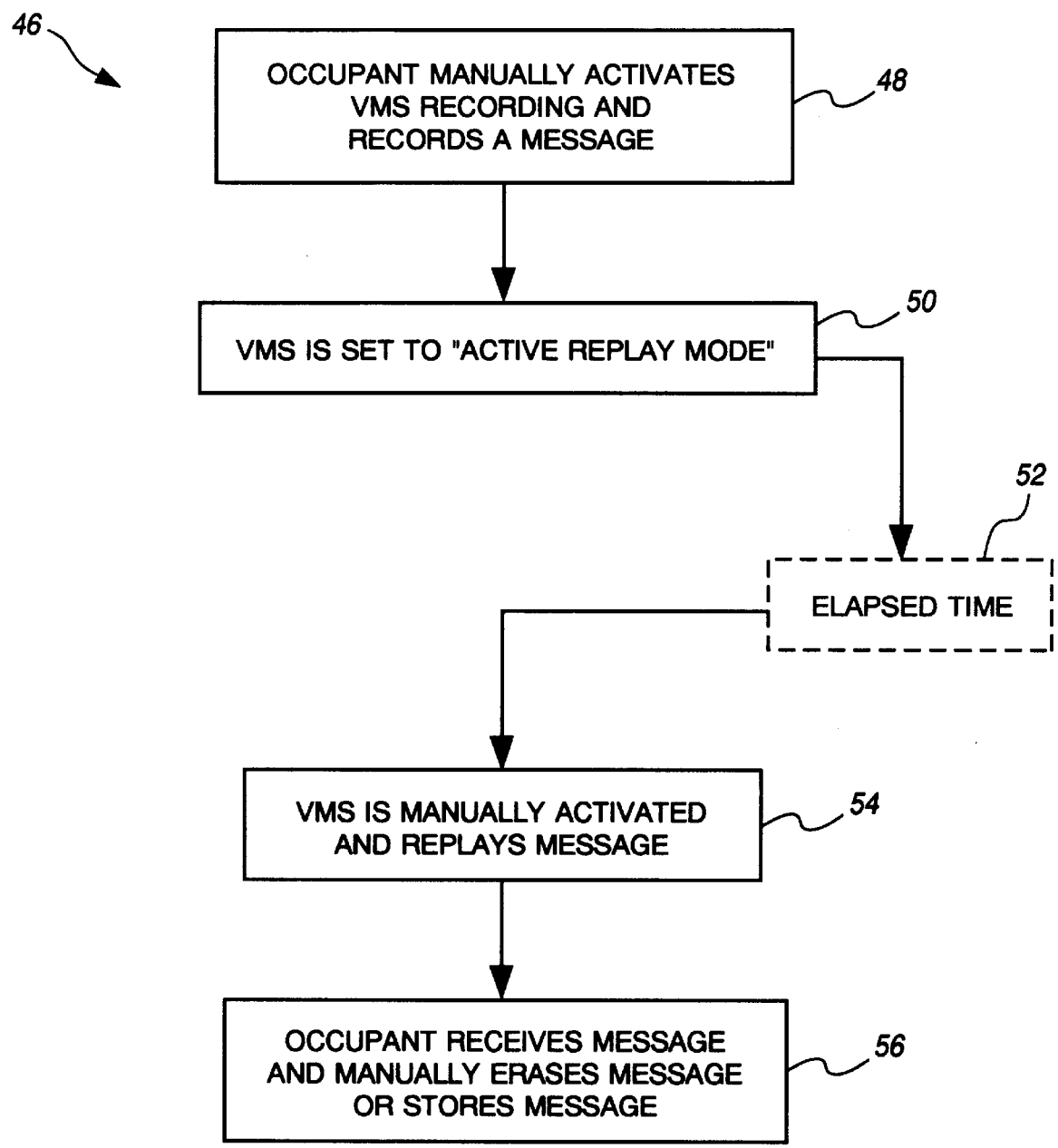
FIG. 2 is a diagrammatic flow chart showing advantageous program features of the present invention.

Referring now to FIG. 2, an active message recording sequence 46 is there shown comprising a series of steps enabling the user to record an active message whenever desired by activating the voice message system with the controller 20 by actuating a button on the pad 38. Preferably, a single push button 39 generates a responsive command signal at 49. The control 20 interfaces with a conventional recorder such as one stored in audio unit 22 or a digital memory bank, preferably in the form of an IC chip, in the controller 20. In the controller 20, the analog message signal is converted to a digital message signal which is then stored in a memory chip for a replay mode.

At the first actuation of the replay command, for example, replay button activation, a vocal command, or a combination of such inputs, the audio system can reproduce the audio message from the audio message signal in response to a manual signal or a command as shown at 50. The audio message is transmitted through the vehicle audio system. As a result, as shown at 52, a signal display is provided after some elapsed time or single operating period of the motor vehicle. The VMS is manually actuated by a user command or actuator. The controller 20 replays a message through the vehicle audio system 12 as shown at 54. Preferably, a replay message has audio priority over other audio system outputs to the speakers, any active attenuated outputs being muted while the voice message system replays a recorded message. When the occupant has received the message, the audio message may be stored by an actuator, a vocal command or a combination of such inputs, or is otherwise erased as shown at 56.

Figure 3:
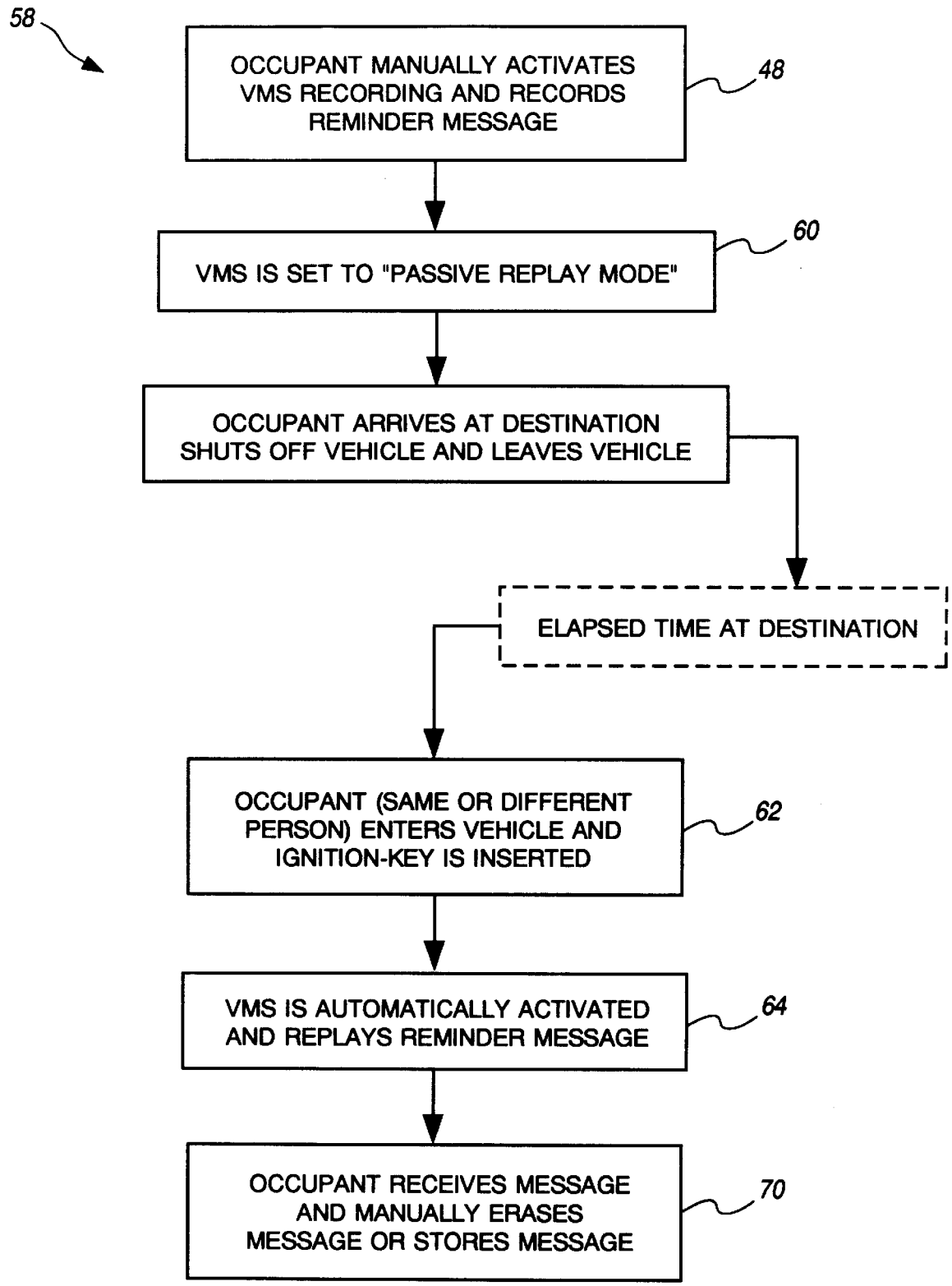
FIG. 3 is a diagrammatic flow chart of another program providing another advantageous feature of the present invention.

Referring now to FIG. 3, an active message recording and passive replay program mode 58 includes a user control manual activation the same as step 48 as referred to in system mode 46. The vehicle message system is then set to passive replay mode by user control actuation or commands. By the setting of the passive replay mode, each actuation of the ignition switch prompts the controller 20 to deliver the messages stored for passive reply as shown at 62. Such stored messages will be replayed automatically without further activity of the motor vehicle user as shown at 64. After each audio message is disseminated to the audio system 12, the user erases the message by press of a button on button pad 38, or stores the message by press of the "store" button located on the button pad 38 as shown at 70 in FIG. 3. Preferably, the storage of a message signal will be a default condition so that the message is automatically saved unless erased, but erasure could also be selected as a default condition to avoid excessive accumulations of passively replayed messages.

Figure 4:
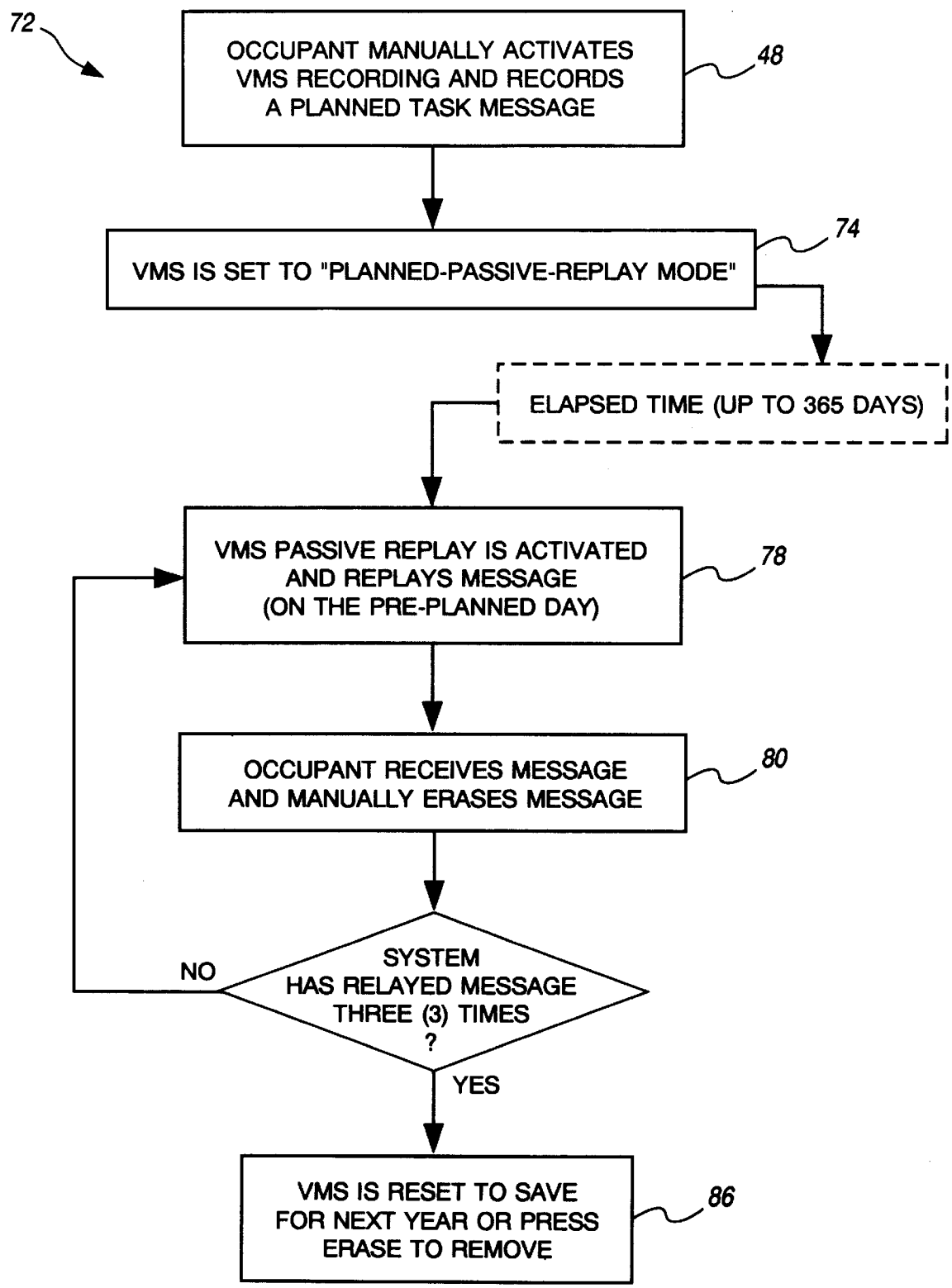
FIG. 4 is another diagrammatic flow chart demonstrating program steps applicable to another advantageous feature of the present invention.

Referring now to FIG. 4, a variation of the system shown in FIG. 3 is included in the program 72 for active message recording and passive replay with planned task mode shown in FIG. 4. As with the previous system operating features, the user actuates the interactive button pad 38, preferably, a record button at the steering wheel, to initiate recording capability of the vehicle message system 10. The Voice Message System is then set to planned passive replay mode by actuator or vocal command for planned task mode, as shown at 74. At this point, a selecting actuator, or voice command consistent with the voice recognition protocol, is used to set the time period for reoccurrence of the audio messages. In this manner, a time designation, or a time period for reoccurrence preferably up to 365 days, can be associated with the audio message signal stored in the controller 20. When the system clock or clock in the controller 20 has reached the time designation associated with the voice message signal, a subsequent actuation of the ignition switch 14 will initiate replay of the message as shown at 78.

As in the program 58, once the user receives the message, the user manually erases the message, preferably by press of erase button 59 on pad 38, as shown at 80 in FIG. 4. In addition, a counter determines whether the message has previously been repeated at 82. After the number of repetitions reaches a predetermined number, the message is saved for periodic return after the next elapsed time period upon actuating or commanding a save signal. If less than 3 or other predetermined number of replays has occurred, the message is automatically stored for passive replay. If the three replays have occurred, the message is automatically erased unless the save actuator 69 on the pad 38, or a voice command, is set by the user. The message can also be erased at any time by pressing erase button 59 on pad 38 or saved at any time by pressing save button on pad 38 for the next periodic time designation as shown at 86 in FIG. 4. Otherwise, an audio message replayed less than the desired number of repetitions automatically stored in memory until the next subsequent actuation of the ignition switch 14.

Referring now to FIG. 5, passive message recording program 88 is there shown in which the initial step 90 is a delivery of sensor signal 36 to the controller 20 in response to actuation of the air bag deployment switch 16. As shown in FIG. 4, the signal is sent within approximately 4 milliseconds of the actual triggering event causing control signal 36 to be generated by switch 16. Moreover, ten milliseconds after the event, while the air bag is being actuated, the control signal 36 enables the controller 20 to activate the audio system to record the event or other information conveyed by the user of the motor vehicle. In such an event, a time designation associated with the message is a current time designation so that the information recorded can be immediately retrieved by subsequent actuations of the play button on pad 38. Accordingly, the message may be retrieved by personnel attending to the system user or other occupants of the motor vehicle and the message is automatically stored for repeated retrieval with the current time stamped designation as shown at 94 in FIG. 5. As a result, within a fraction of a second after the initiating event takes place, the voice message system of the present invention has reacted and permits preservation of the occurrence of the event as well as any audio messages created just after the air bag diagnostic switch has actuated.

The air bag diagnostic switch may also provide a retriever signal that retrieves messages saved for emergency purposes only. The emergency message, for example, a driver's medical report including drug allergies, blood type, etc., may be released from a save memory upon generation of a signal from the air bag diagnostic switch.

Likewise, an emergency actuator, or a voice command "emergency", may be employed after recording a message to designate it for retrieving upon control 20 receiving output generated at said air bag diagnostic switch in response to a diagnosed impact. Such messages may be retrieved for playing in series with imminently recorded messages at the time of diagnostic switch output to the controller 20.

As a result, the present invention provides a substantially more useful vehicle message system than previously known systems. In fact, a value benchmarking determination established that the value, determined as a ratio of the function to the cost for the system features, indicated an increase in value ratio of from 0.3 to 2.0 even when based on rough variable cost estimation.

Having thus described the present invention, many modifications thereto will become apparent to those skilled in the art to which it pertains without departing from the scope and spirit of the present invention as defined in the appended claims.

What is claimed is:

1. A method for operating a vehicle message system including a vehicle audio system having record, store and replay audio function modes, the method comprising:

recording an audio message by reproducing a vocally intoned output as a message signal in the record functional mode of said vehicle message system;

storing said message signal;

retrieving said message signal in response to a first predetermined actuator;

reproducing said audio message on said vehicle audio system from said retrieved message signal;

wherein said actuator comprises an ignition switch and said retrieving step comprises closing said ignition switch; and wherein said reproducing step comprises passively reproducing said audio message.

2. The invention as defined in claim 1 wherein said recording step is an automatic response to actuating an air bag activation switch.

3. The invention as defined in claim 1 and further comprising associating a time specific designation with said message signal.

4. The invention as defined in claim 3 wherein said time specific designation is a current time designation.

5. The invention as defined in claim 3 wherein said time specific designation is a periodic time designation and wherein said retrieving step comprises matching a clock pulse designation to said time specific designation.

6. The invention as defined in claim 1 wherein said reproducing step comprises serially reproducing said message signal a plurality of times, each time occurring at each sequential operation of said actuator.

7. The invention as defined in claim 1 and further comprising saving said retrieved signal for reproducing said audio message at the next sequential operation of said actuator.

8. The invention as defined in claim 7 and further comprising retrieving the saved signal and reproducing said audio message from said saved signal.

9. The invention as defined in claim 7 and further comprising passively deleting said message after a predetermined number of reproducing steps have occurred.

10. A method for operating a vehicle message system including a vehicle audio system having record, store and replay audio function modes, the method comprising:

recording an audio message by reproducing a vocally intoned output as a message signal in the record functional mode of said vehicle message system;

storing said message signal;

retrieving said message signal in response to a first predetermined actuator;

reproducing said audio message on said vehicle audio system from said retrieved message signal; and wherein said recording step is an automatic response to actuating an air bag activation switch.

11. An audio system enhancement for a vehicle audio system having an audio message recorder, an audio message player and a command module including a microcomputer and an operator terminal, the enhancement comprising:

an actuator for single engagement initiation of said recorder to record an audio message;

an address designator for including a time designation with said message;

a store memory for storing the message upon completion of recording;

a store memory for saving said message until said predetermined time designation;

a retriever for selecting and delivering a stored message to said player including a first predetermined actuator for automatically operating said player in passive response to a vehicle function; and a storer for automatically storing said message until said actuator has functioned a second predetermined number of times.

12. The invention as defined in claim 11 wherein said first predetermined actuator comprises a vehicle function switch.

13. The invention as defined in claim 12 wherein said actuator comprises an ignition switch.

14. The invention as defined in claim 12 wherein said actuator comprises an air bag activator switch.

15. An automatic audio reminder system for a motor vehicle having a steering wheel, and having an audio recording and playback system including:

an actuator on said steering column for single engagement initiation of recording an audio message;

storage means for automatically retaining said message for audio playback;

a playback initiator comprising a first predetermined vehicle function actuator and a control for responding to said predetermined vehicle function actuator by commanding said audio system to play back said audio message;

a counter for determining and identifying with an audio message signal the number of times said audio message has been played; and a storer for returning said identified audio message signal to storage unless said identified audio message signal has been played a predetermined number of times.

16. The invention as defined in claim 15 and further comprising a save condition signal actuator for associating said audio message with a periodic time designation.

17. The invention as defined in claim 15 and further comprising an emergency signal actuator for associating said audio message with an air bag diagnostic switch actuation.

* * * * *